Figure 1:
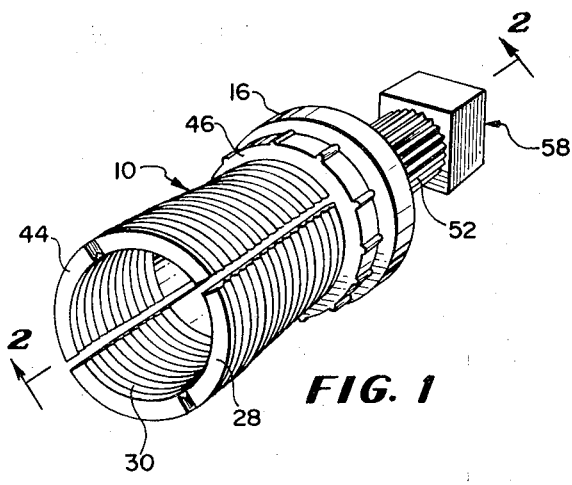

United States Patent [19]
Hemingway

[11] 3,777,356
[45] Dec. 11, 1973

[54] PIPE NIPPLE TOOL
[76] Inventor: Joseph M. Hemingway, 14932 Avalon, Dolton, Ill. 60419
[22] Filed: Apr. 4, 1972
[21] Appl. No.: 240,982

[52] U.S. Cl.................. 29/428, 29/237, 151/14 R, 151/19 A, 279/7, 279/99
[51] Int. Cl............................................ B23p 19/04
[58] Field of Search..................... 29/237, 240, 428, 29/559; 81/53.2, DIG. 7; 279/7.99; 285/34, 39, 322; 151/14 R, 19 A

[56] References Cited
UNITED STATES PATENTS
915,184   3/1909   Keirn..................................... 81/53.2
570,233   10/1896  Schulze................................... 279/7

Primary Examiner—James L. Jones, Jr.
Assistant Examiner—Mark S. Bicks
Attorney—Watson D. Harbaugh et al.

[57] ABSTRACT

A pipe nipple tool that clamps the nipple wall at one end over its threaded area between an inside mandrel and outside contractable segmented clamping jaws that circumferentially engage the nipple at the roots of its thread with both the mandrel and clamping jaws interlocked to turn as a unit either to tighten or loosen a threaded joint involving the other end of the nipple.

14 Claims, 5 Drawing Figures

PATENTED DEC 11 1973  3,777,356

PIPE NIPPLE TOOL

BACKGROUND OF THE INVENTION

Distortion and pipe damage is a problem in the pipe fitting trades when installing or removing threaded pipe nipples because there is insufficient length and pipe stock, particularly with close or short nipples, to withstand the jaw pressures of conventional pipe wrenches. Even after the wrench jaws are finger adjusted tight, they contract further under the turning pressure exerted on the wrench handle and ovate the nipple, damage the threads and render the nipple useless whether it is being installed or removed.

A standard pipe thread has a 60° thread angle rounded at the crest and root, and, although help can be had in tightening, but not loosening, a nipple by a tool that end abuts the nipple when threadedly engaging the threaded portion of the nipple the resulting forces are essentially crosswise to the thread in a way that the upper thread crest may be distorted and cause a leaking relationship which a pipe thread is designed to eliminate. Also, there is a paradox. The tighter the nipple and tool threads become before the parts endabut, the greater the problem is to remove the tool without again loosening the nipple. Otherwise, anything less than abutment involves only the smaller diameter thread turns of the thread taper which increases the danger of the axial distortion of the thread.

Other devices have been tried involving uncontrolled expanding pressures against the inner wall of the nipple before or after tightening is accomplished. However, splitting the pipe is a hazard which may cause leaking not immediately detected particularly if temperature changes are involved with the nipple in use.

SUMMARY OF INVENTION

In the present invention a tumbler-shaped member has its sides externally and internally threaded and then longitudinally split into quadrants to provide slightly diverging free ended jaws extending from a heavy end wall. The internal thread has a high sharp crest to engage the roots of the nipple thread and the divergence of the jaws is appreciably greater than the taper of the nipple thread so that they can be easily advanced to cover the length of the nipple thread. The external thread is an easy running thread preferably with flat crests to receive a runner nut on them having a mating thread for progressively contracting the diverging jaws inwardly. The end wall of the member is a heavy one having a non-circular socket and a central opening in it. A cooperating member serving as an anvil key closely fitting the inside wall of the nipple is received in the nipple through the central opening and has a non-circular head non-rotatively mating with the socket in the end wall for simultaneous rotation therewith.

In operation the jaw member is threaded on the nipple the length of the nipple thread; the anvil key is inserted through the central opening for the head and socket to mate; the runner nut is moved axially to contract the jaws and drive the sharp crests into tight clamping relationship with the roots of the nipple thread even to the point that the ends of the thread segments are under pressure in the roots; and, torque is applied to the jaw member and anvil key to install or remove the nipple without deforming the nipple as more particularly illustrated and described herein.

IN THE DRAWINGS

Figure 3:
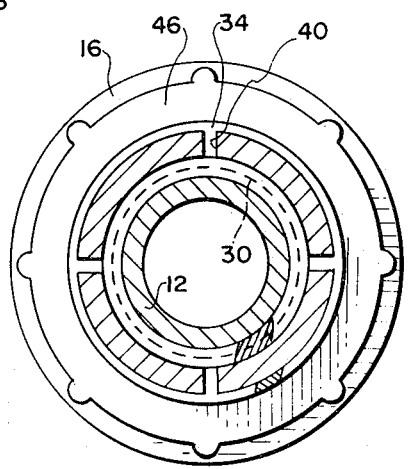
Figure 2:
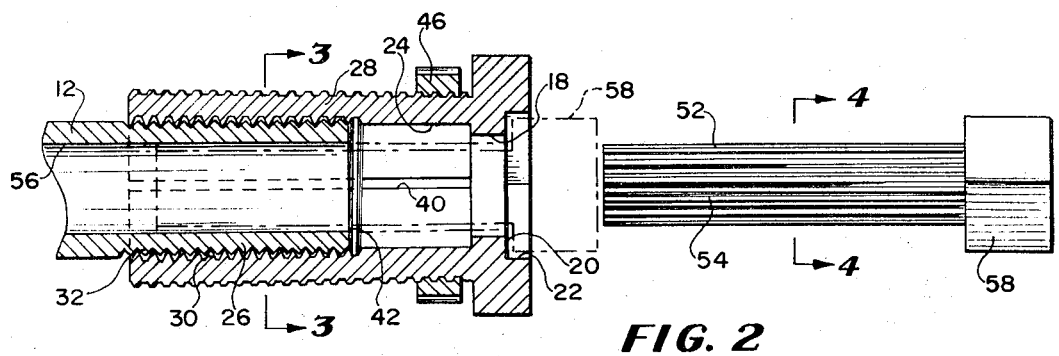
Figure 4:
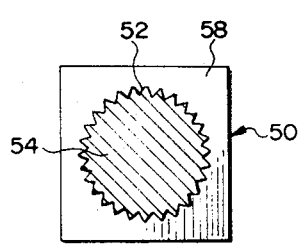
Figure 5:
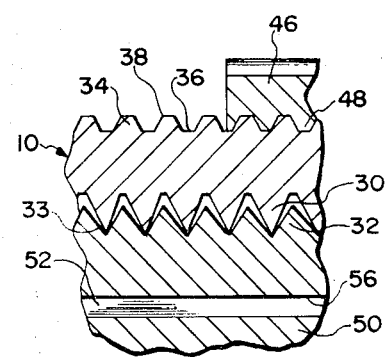

FIG. 1 is a perspective view of an embodiment illustrating the invention;
FIG. 2 is a section taken on line 2—2 of FIG. 1;
FIG. 3 is a section taken on line 3—3 of FIG. 2;
FIG. 4 is a cross-sectional view of the wedge key shown in FIG. 2.
FIG. 5 is an enlarged view of the thread relation shown in FIG. 2 with the runner nut advanced; and Referring to FIG. 1 a tool 10 embodying the invention is shown ready for installation on one end of a pipe nipple 12 having a standard tapering 60° pipe thread 32 and FIG. 5 shows the final relationship of the elements ready for a tightening or loosening of a threaded connection at the other end of the nipple to a pipe fitting (not shown).

The tool comprises a head portion 16 of substantial thickness having a central opening 18 outwardly enlarged to provide a shoulder 20 and a square wrenching socket 22. Inwardly, the opening 18 is enlarged at 24 to receive a threaded end 26 of the nipple 12 therein within a segmented wall 28 defining a taper appreciably greater than the pipe taper. The wall 28 is internally threaded with a female thread 30 of the same pitch as the pipe thread 32 but whose thread angle preferably is less by 5 to 10 degrees to accentuate the sharpness of the crest 33 and provide clearance between the walls of the engaged thread.

The smallest crest diameter of the sharp crest 33 is approximately the same as the smallest root diameter of the pipe thread root 35 at its minor taper diameter. At their major taper diameters, the crest diameter of the female thread 30 is approximately the pitch diameter of the pipe thread 32 so that the installation of the tool on the pipe thread is easily accomplished.

The external surface of the tool wall 28 may be provided with a standard coarse thread, but preferably is provided with a heavy acme-type thread 34 characterized by a flat root 36 and flat crest 38 but with a 2° taper corresponding substantially to the taper of the female thread 30. Both of the threads 30 and 34 are then segmented by axially extending slots 40 through the tool wall 28. The slots 40 extend inwardly an appreciable distance beyond the inner end 42 of the thread and thereby provide axial spring jaws 44 preferably four in number, carrying the thread segments which flex inwardly to a point collectively where the diameters of the external thread 34 are uniform throughout its length to receive a runner nut 46 thereon having an internal thread 48 mating with the external thread on the jaws. When threaded on the segments to a starting point adjacent the head 16 the free ends of the jaws resume their taper orientation already described.

All standard nipples have a known inside diameter, and an anvil key 50 having a 2° tightening taper and slightly chamfered for insertion ease, is provided preferably with longitudinal roughenings or serrations 52 on the surface of its shaft 54 whose major diameter size is large enough for them to engage the inner surface 56 of the nipple with contact pressure when inserted into a nipple having a major production tolerance diameter.

The anvil key 50 has a square head 58 which non-rotatively engages in the square socket 22 when the anvil key is fully inserted in place through the opening 18. The head preferably extends a substantial distance outwardly to receive a nut and bolt wrench thereon (not shown) which will turn the barrel and anvil key in unison.

The runner nut 46 is then advanced on the external threads 34 to drive the sharp crests 33 of the internal thread segments 30S against the root 35 of the pipe thread 32, and progressively clamping them tighter and tighter to the point of maximum expected wrenching effort. In doing this the nut 46 moves on two pairs of co-cylindrical surfaces at 36 and 38 quite easily with lubrication at minimal effort. The nipple body 12 being supported by the anvil key 50 at surface 56 cannot deform to localize the applied effort but withstands all radial and torsional effort uniformly throughout its threaded length to attain not only the advantage of abutment wrenching but also maintain thread form and its sealing characteristics and provide for loosening as well as tightening operations.

Although all threads described may turn in the same direction it is preferred that the runner nut thread be a left hand thread so that the relative manual action of the wrenches in tightening or loosening the nut is in opposite directions of rotation for ease of handling and application. This is also an advantage if simultaneous wrenching engagement of both the runner nut 46 and head portion 16 occurs, even unintentionally, because there would be no loosening of the tool while endeavoring to loosen the nipple.

On the other hand, since a nipple can be adequately tightened by wrenching the square head 58 of the tool without slack take-up between head portions 16 and 58 there is no disadvantage when tightening a nipple, but rather an advantage with the left hand thread being able to loosen the runner nut 46 in the nipple tightening direction to remove the tool with or without holding the wedge key, and, if the anvil key 50 is wrench held the tool loosening directions are again in opposite directions for manual wrenching conditions without loosening the nipple. Accordingly, the nipple and the tool are easily useable in close quarters, where nipples usually are disposed, without any need for touching the nipple with a deforming wrench.

Preferably, the runner nut 46 and head portion 16 are approximately the same size so that either or both can be held by the same wrench while the square head of the wedge key is of a different size so that two identical wrenches need not be required to use the invention since most journeymen have a range of wrench sizes rather than duplicates.

As already noted an important object of the invention is in not touching the nipple body with a distorting wrench. The nipple is pressure contacted at the root of its thread where thread make-up and sealing is not damaged and the contact does not extend continuously more than a quarter turn of the thread with a quadrant segmentation of the thread. Furthermore, the clamping action is in a radial direction through the wall of the nipple without any displacement of metal so that the nipple is not contacted in any way which would damage a thread seal or weaken the nipple wall.

Where a nipple is to be removed whose thread is rusty and inner wall lined with scale, the inner end of the anvil key is sharply square to dislodge internal scale for metal to metal contact as it is moved into position, and the sharp crests of the tool thread segments bite through rust to the metal at the roots of the pipe thread and still provides room for displaced material between the sides of the meshing threads. Thereby the segmented ends of the sharp thread segments can take purchase in nipple metal at the roots of the nipple thread as a series of teeth peripherally embedding in the metal uniformly and peripherally to exert rotation in either direction without any axial effort on the nipple threads at either end.

Although the stress bearing parts may be made of cast steel, the parts are preferably made of easily machinable steel, hardened for use, and all are completely separable for ease of cleaning and inspection as well as usable with conventional tools that are present in a journeyman's tool bag.

What is claimed is:

1. A tool for rotating a pipe nipple comprising a central member having a head element and circumferentially spaced wall segments extending axially therefrom defining jaws, thread means on the inner faces of said jaws defining segmented sections of a sharp crest thread having a standard pipe thread pitch and a thread angle appreciably less than that of a standard pipe, means engaging the outer surface of said jaws for contracting them under pressure to clamp the sharp crest sections against the roots of a standard pipe tapered thread, and means for rotating said central member about the axis of said threads.

2. The combination called for in claim 1 in which said engaging means comprises a clamping thread defined on the outer surface of said segmented sides, and a runner nut threaded on said clamping thread to vary the effective crest diameter of said sharp crest thread.

3. The combination called for in claim 1 including an anvil key element received through said head to closely fit and engage the inside surface of a nipple within said jaws.

4. The combination called for in claim 3 in which the head element and anvil key element have interfitted elements to secure said elements against relative rotation.

5. The combination called for in claim 4 in which one of said elements has a wrench engageable shape for rotating said elements simultaneously.

6. The combination of claim 2 in which the clamping thread turns in a direction opposite to that of said thread means.

7. The combination of claim 2 in which said sharp crest thread has 1. a greater height than that of said pipe thread when clamped in place,
2. a pitch diameter appreciably greater than that of the pipe thread to provide clearance between its sides and a standard pipe thread engageable therewith; and
3. a minor crest diameter that is less than that of said pipe thread root diameter for an interference clamping relationship therewith.

8. The process of threadably tightening and loosening a standard pipe nipple comprising, engaging only the root of the nipple thread circumferentially over a plurality of thread turns with portions of a sharp crest mating thread edge, applying a contracting clamping pressure upon the root of the nipple thread, rigidly supporting the inner wall of the nipple by a member over a substantially peripheral area of engagement within the confines of the area of said clamping pressure, and rotating said member and thread edge portions simultaneously about the axis of said nipple thread to threadably tighten and loosen a standard pipe nipple.

9. The steps called for in claim 8 in which said thread edge portions are thread segments having square ends defining sharp corners engaging in the metal at the root of said nipple thread.

10. The steps called for in claim 8 in which the root is rounded and the thread angle of the standard thread is 60° and the thread angle of the sharp crest mating thread is appreciably less than 60° for the threads to clear at their pitch diameters.

11. A tool for clamping and rotating a pipe nipple comprising a tumbler-shaped member having an end wall and its sides externally and internally threaded and longitudinally split into quadrants that provide slightly diverging free-ended jaws extending from the end wall, said internal thread having a high sharp crest to engage the roots of a standard pipe thread with a divergence taper appreciably greater than that of a pipe thread, said external thread having a flat crest and a flat root, a runner nut mounted on said member adjacent to said end wall and having a mating thread engaging the external thread for movement from said end wall to progressively contract the diverging jaws inwardly as it is rotatively tightened, said end wall of said member being a heavy one having an external opening and a non-circular socket in it, and an anvil key received through said external opening with its wall in predetermined radially spaced relation from said internal thread and having a non-circular and mating non-rotatively with said socket in the end wall for simultaneous rotation therewith.

12. A tumbler-shaped member having a heavy end wall with a noncircular socket and a central opening through it and longitudinally segmented slightly diverging free-ended jaws having internal and external threads, said internal thread having high sharp crest edges to engage the roots of a standard pipe thread with the divergence of the jaws appreciably greater than the taper of a standard pipe thread so that they can be easily advanced to cover the length of a standard pipe thread and the external thread being an easy running thread, running nut means on said external thread for progressively driving the diverging jaws inwardly under a contractive force as it is advanced towards the free ends of the jaws to drive said sharp edges into metal-to-metal engagement under pressure with the root of a standard pipe thread, and a headed anvil key means for closely fitting the inside wall of a pipe having said standard pipe thread externally thereon and receivable through the central opening with a non-circular head non-rotatively mating with said socket in the end wall for simultaneous rotation therewith.

13. The combination called for in claim 12 in which said external running thread mates with the thread of the running nut means and both threads have mating flat roots and crests for transmitting said contractive force essentially in a directly radial direction between the threads.

14. The combination called for in claim 12 in which said anvil key has a tightening taper and longitudinal roughening whose major diameter size is large enough for them to engage the inner surface of a known pipe size with contact pressure when inserted with such a pipe having a major production tolerance diameter.

* * * * *